(12) United States Patent
Klein

(10) Patent No.: US 8,201,576 B2
(45) Date of Patent: Jun. 19, 2012

(54) REINFORCED ELASTOMERIC HINGE CHECK VALVE

(76) Inventor: Gerald A. Klein, Erie, PA (US)

( * ) Notice: Subject to any disclaimer, the term of this patent is extended or adjusted under 35 U.S.C. 154(b) by 1117 days.

(21) Appl. No.: 11/420,858

(22) Filed: May 30, 2006

(65) Prior Publication Data
US 2007/0235088 A1 Oct. 11, 2007

Related U.S. Application Data

(60) Provisional application No. 60/744,280, filed on Apr. 5, 2006.

(51) Int. Cl.
*F16K 15/14* (2006.01)

(52) U.S. Cl. .................... 137/512.15; 137/527

(58) Field of Classification Search ............ 137/511, 137/512.1, 512.15, 527, 512.4, 512.5; 251/298, 251/358
See application file for complete search history.

(56) References Cited

U.S. PATENT DOCUMENTS

| | | | |
|---|---|---|---|
| 3,047,012 A | 7/1962 | Smith | |
| 3,208,472 A * | 9/1965 | Scaramucci | 137/454.2 |
| 3,292,658 A * | 12/1966 | Scaramucci | 137/856 |
| 3,656,502 A | 4/1972 | Howe | |
| 4,195,657 A | 4/1980 | Pysh | |
| 4,257,444 A | 3/1981 | Ogle, Jr. et al. | |
| 4,534,538 A * | 8/1985 | Buckley et al. | 251/62 |
| 4,556,086 A * | 12/1985 | Raines | 137/852 |
| 4,596,268 A | 6/1986 | Jonas et al. | |
| 4,696,263 A * | 9/1987 | Boyesen | 123/65 V |
| 5,033,495 A | 7/1991 | Monauni et al. | |
| 5,048,560 A | 9/1991 | Jannotta et al. | |
| 5,285,816 A | 2/1994 | Herlihy | |
| 5,301,709 A | 4/1994 | Gasaway | |
| 5,521,000 A * | 5/1996 | Owens | 442/218 |
| 5,711,343 A | 1/1998 | Beckett | |
| 6,085,788 A | 7/2000 | Larson et al. | |
| 6,098,656 A | 8/2000 | Farina | |
| 6,237,625 B1 | 5/2001 | Randolph | |
| 7,163,197 B2 * | 1/2007 | Yoshioka et al. | 261/78.2 |
| 7,533,696 B2 * | 5/2009 | Paul, Jr. | 137/846 |

OTHER PUBLICATIONS

Seattle Fabrics [online] Dec. 2004 [ retrieved on Mar. 11, 2009] Retrieved from the Internet: <URL:http://www.seattlefabrics.com/vinyl.html.*

PTFE Coated Fiberglass Fabrics [online] Apr. 2001 [ retrieved on Mar. 11, 2009] Retrieved from the Internet: <URL:http://www.hpp4u.com/data/teflrf.html.*

All you want to know about Polyetheretherketon (PEEK [online] Jun. 2003 [ retrieved on Mar. 11, 2009] Retrieved from the Internet: <URL:http://www.netmotion.com/htm_files/wh_properties.htm.*

* cited by examiner

*Primary Examiner* — Kevin Lee
*Assistant Examiner* — Macade Brown
(74) *Attorney, Agent, or Firm* — Johnathan M. D'Silva; MacDonald, Illig, Jones & Britton LLP

(57) ABSTRACT

A check valve assembly installable in a valve body comprising an elastomeric hinge that includes an elastomeric member and a hinge member around which the elastomeric member can bend. The elastomeric member is coupled to the hinge member. At least one rigid valve plate is coupled to the elastomeric member. At least one layer of reinforcement material is coupled to the elastomeric member and extends at least between the hinge member and the at least one rigid valve plate. The reinforcement material is sufficiently flexible to bend over the range of movement of the elastomeric member, substantially unstretchable, and capable of resisting abrasion forces encountered while the check valve is in operation.

51 Claims, 5 Drawing Sheets

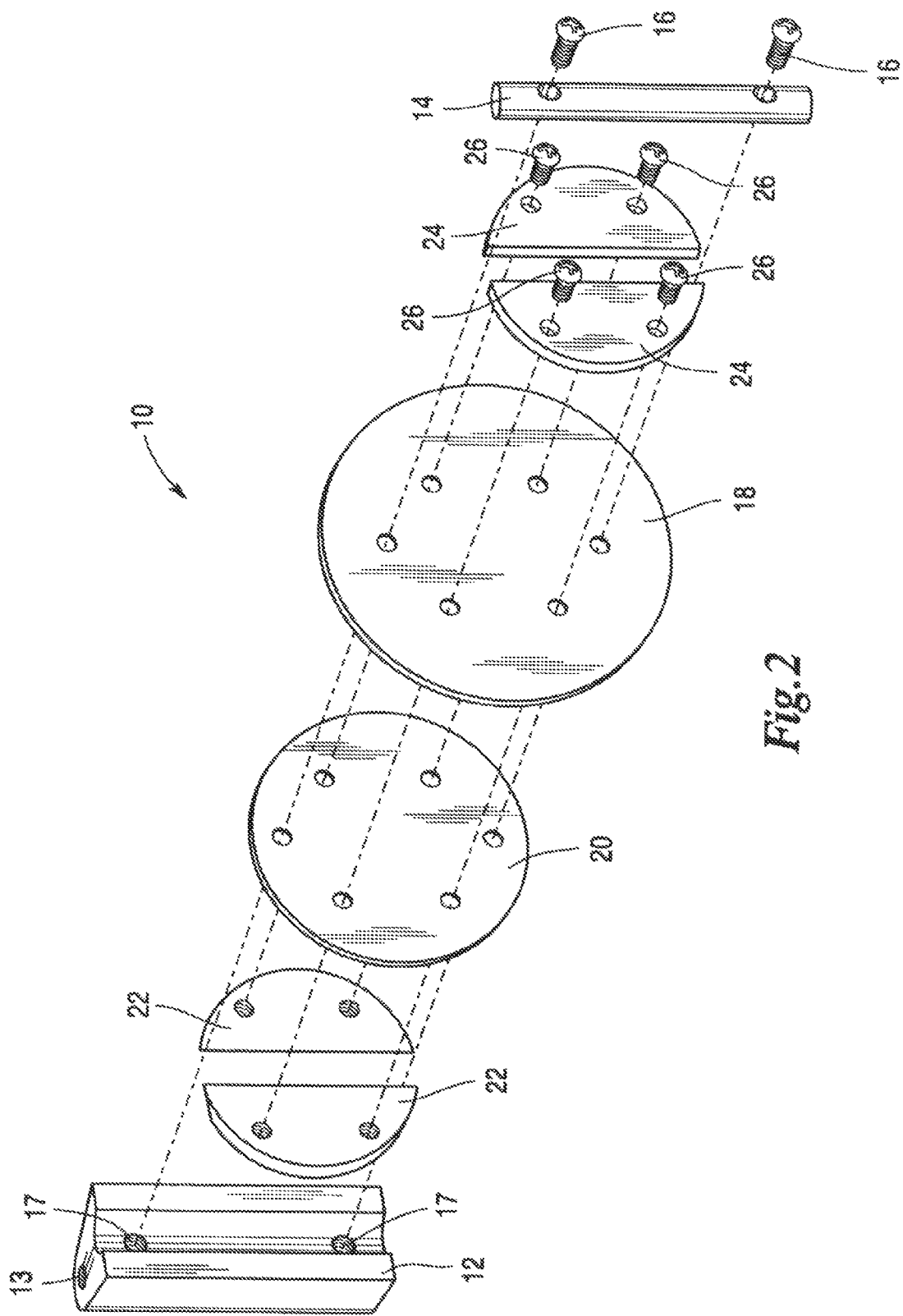

REINFORCED ELASTOMERIC HINGE CHECK VALVE

This application takes priority from U.S. provisional application 60/744,280, filed Apr. 5, 2006, which is incorporated herein by reference.

BACKGROUND

The invention relates to improvements to check valves having elastomeric hinges. Check valves are used in various applications to permit flow in one direction in a pipe but restrict flow in the opposite direction. Check valves are available in various designs but essentially comprise a valve body that houses a check valve assembly. The check valve assembly includes at least one valve plate that blocks return flow when the valve is in the closed position. An elastomeric hinge check valve is a type of check valve in which the check valve assembly includes an elastomeric hinge that typically comprises an elastomeric member and a hinge member around which the elastomeric member can bend. The elastomeric member is usually secured to the hinge member. Various designs of elastomeric check valves include, among other things, springs or other mechanical devices to bias the check valve assembly in a closed position.

The elastomeric member is typically sized to fit into a valve body such that when the check valve is in the closed position, the elastomeric member forms a seal against the inner dimension of the valve body. Check valves assemblies are sold either enclosed in a valve body for immediate insertion into a conduit system or as internal mechanisms for later installation in valve bodies.

During the normal course of operation of a check valve, the check valve assembly, housed in a valve body, is installed in a conduit system that conveys a material that is required to flow in one direction. This could be a sewer system, a drinking water system, a manufacturing facility, a food processing facility, a natural gas line, etc. Check valves are installed at locations in conduit systems where, for whatever reason, material may tend to flow in the opposite direction from what is required. For example, in a drinking water system in which a water pump is used to pump water uphill, if the pump is shut off, the water in the pipes will tend to run downhill, or backflow, to the pump. A check valve would be installed after the pump to prevent unnecessary wear or damage to the pump from this backflow coming in the wrong direction. The direction that the flow of material is required to go is called the downstream direction. The direction that the flow is required to come from is called the upstream direction. A variety of types of check valves could be installed in conduit systems to prevent backflow in the upstream direction.

One of the weak points of elastomeric hinge check valves is the elastomeric member itself. The elastomeric member is typically made of a flexible rubber or other elastomeric material that can bend around the hinge member. Over the course of its operation the elastomer will tend to stretch or will be abraded due to contact against the edge portions of the check valve components or due to erosion caused by material flowing in a conduit system in which the check valve is installed. These stresses can stretch and cut the elastomeric member making the valves ineffective or less effective and reduce the life expectancy of the valve.

SUMMARY

An improved check valve assembly for an elastomeric hinge check valve, according to one embodiment, comprises an elastomeric hinge that includes an elastomeric member and a hinge member around which the elastomeric member can bend. The elastomeric member is coupled to the hinge member. The check valve assembly includes at least one rigid valve plate coupled to the elastomeric member. At least one layer of reinforcement material is coupled to the elastomeric member. The layer of reinforcement material is at least sufficiently flexible to be able to bend over the range of movement of the elastomeric member, substantially unstretchable, and capable of resisting abrasive forces incurred while the check valve is in operation. The layer of reinforcement material is sized to reinforce the elastomeric member from at least the hinge member to the at least one rigid valve plate.

According to one embodiment, the reinforcement material can be sized to reinforce the elastomeric member from at least where the elastomeric member is coupled to the hinge member to at least where the elastomeric member is coupled to the rigid valve plates. In another embodiment, the check valve assembly can also include clamp plates that are coupled to the rigid valve plates. Additionally, the elastomeric hinge can also be mounted to a hinge post.

The check valve assembly is installable in a valve body for subsequent installation in a conduit system. The check valve assembly can have elastomeric components sized and configured to form a seal against the inner dimensions of the valve body when the check valve is in the closed position. Check valve assemblies can be provided for later installation into valve bodies or can be assembled into valve bodies as components of assembled valves. The layer of reinforcement material can be coupled to the upstream side of the elastomeric member or to the downstream side of the elastomeric member; or a separate layer of reinforcement material can be coupled on each side of the elastomeric member. The layer or layers of reinforcement material can be coupled to the elastomeric member with screws, pins, adhesives, bonding agents, nuts and bolts, or any other appropriate method.

Depending on the application for which the check valve is intended, the layer of reinforcement material can also be selected to have additional properties such as water resistance, chemical resistance, crack resistance, or any other property found to be beneficial. Additional support can be provided to the layer of reinforcement material be selecting material that includes fibers extending in at least one direction in the layer. Further support for the layer of reinforcement material can be provided by selecting material that includes an interwoven network of fibers. These fibers can comprise woven glass fibers or fiberglass, ceramic fibers, polyester fibers, or any other type of fibers found to be beneficial.

Those skilled in the art will realize that this invention is capable of embodiments that are different from those shown and that details of the structure of the elastomeric hinge check valves can be changed in various manners without departing from the scope of this invention. Accordingly, the drawings and descriptions are to be regarded as including such equivalent elastomeric hinge check valves as do not depart from the spirit and scope of this invention.

BRIEF DESCRIPTION OF THE DRAWINGS

For a more complete understanding and appreciation of this invention, and its many advantages, reference will be made to the following detailed description taken in conjunction with the accompanying drawings.

FIG. 2 is an exploded view of the dual plate elastomeric hinge check valve assembly shown in FIG. 1;

DETAILED DESCRIPTION

Figure 1:
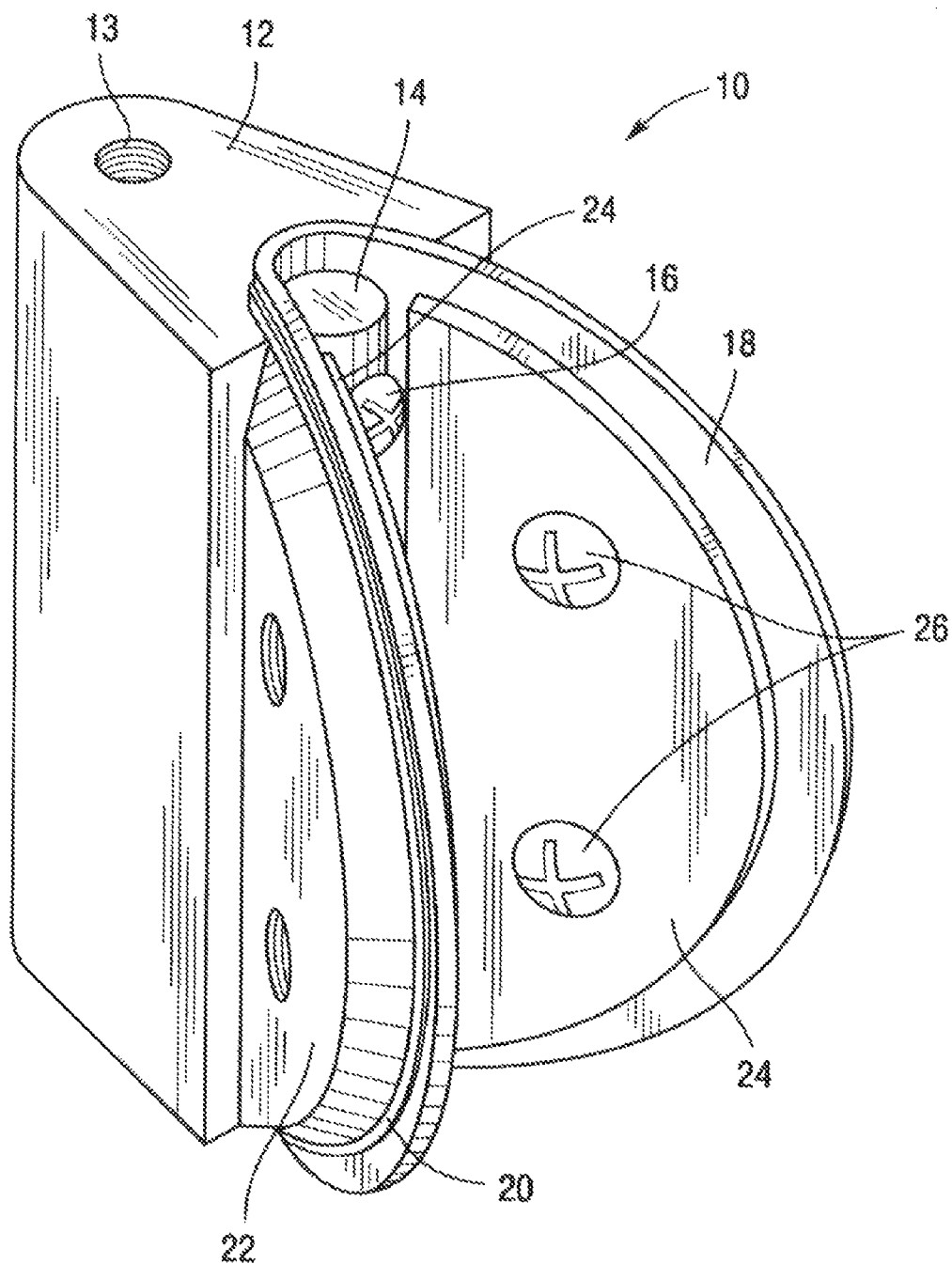
FIG. 1 is a perspective view of a dual plate elastomeric hinge check valve assembly incorporating a layer of reinforcement material on the upstream side of the elastomeric member.

Referring to the drawings, some of the reference numerals are used to designate the same or corresponding parts through several of the embodiments and figures shown and described. Corresponding parts are denoted in specific embodiments with the addition of lowercase letters. Variations of corresponding parts in form or function that are depicted in the figures are described. It will be understood that generally variations in the embodiments can be interchanged without deviating from the invention.

Elastomeric hinge check valves are available in various designs but essentially comprise a valve body (30 in FIGS. 3A-3C and 30b in FIGS. 4A-4C) that houses a check valve assembly (10 in FIGS. 1-3C and 10b in FIGS. 4A-4C) that prevents backflow in a pipe. An elastomeric hinge check valve is a type of check valve in which the check valve assembly includes an elastomeric hinge. The elastomeric hinge typically comprises an elastomeric member (18 in FIGS. 1-3C and 18b in FIGS. 4A-4C) and a hinge member (14 in FIGS. 1-3C and 14b in FIGS. 4A-4C) around which the elastomeric member (18 in FIGS. 1-3C and 18b in FIGS. 4A-4C) can bend. A dual plate elastomeric hinge check valve has the hinge member typically located along the centerline of the valve body with at least one rigid valve plate on each side of the hinge member. Examples of dual plate elastomeric hinge check valves are shown in FIGS. 1-3C. A single plate elastomeric hinge check valve typically has the hinge member located against a wall of the valve body with at least one rigid valve plate to cover the entire cross-section of the valve body. Examples of single plate elastomeric hinge check valves are shown in FIGS. 4A-4C. Other elements of elastomeric hinge check valves are described below.

Figure 3A:
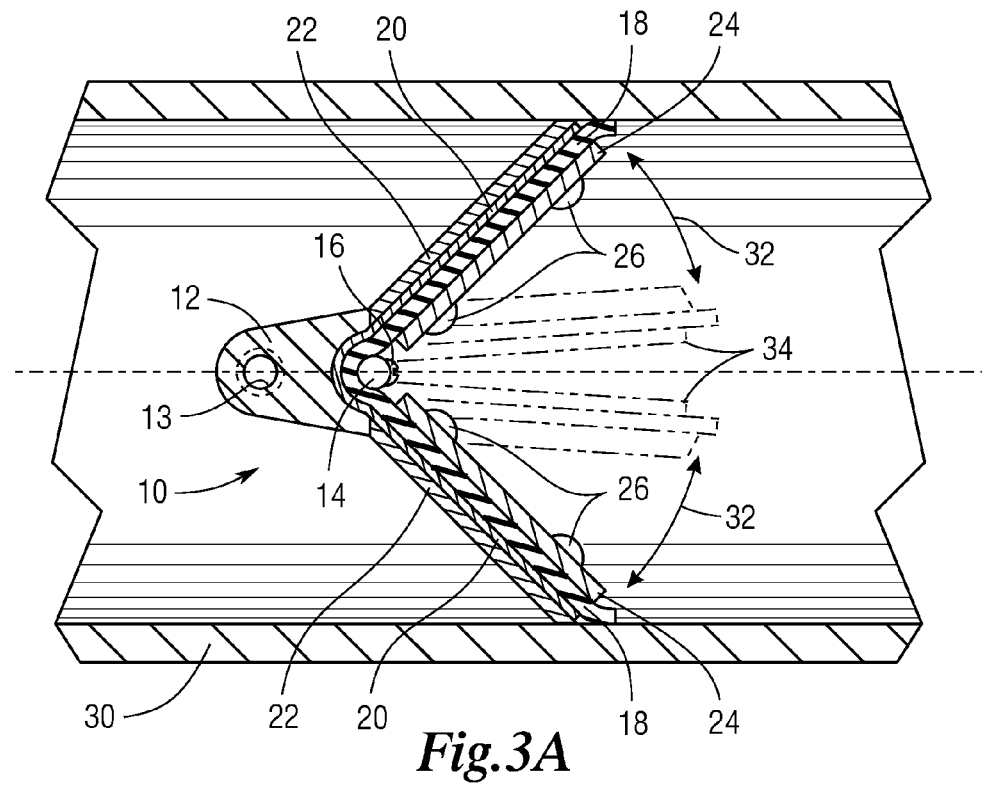
FIG. 3A is a cross-sectional view of a dual plate elastomeric hinge check valve assembly installed in a valve body incorporating a layer of reinforcement material on the upstream side of the elastomeric member.
Figure 4A:
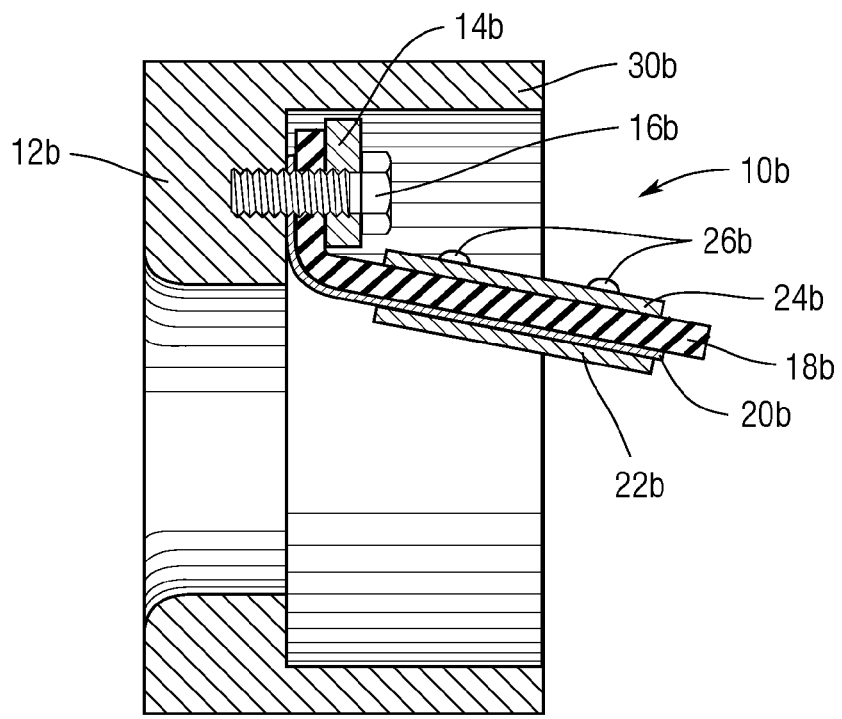
FIG. 4A is a cross-sectional view of a single plate elastomeric hinge check valve assembly installed in a valve body incorporating a layer of reinforcement material on the upstream side of the elastomeric member.
Figure 4B:
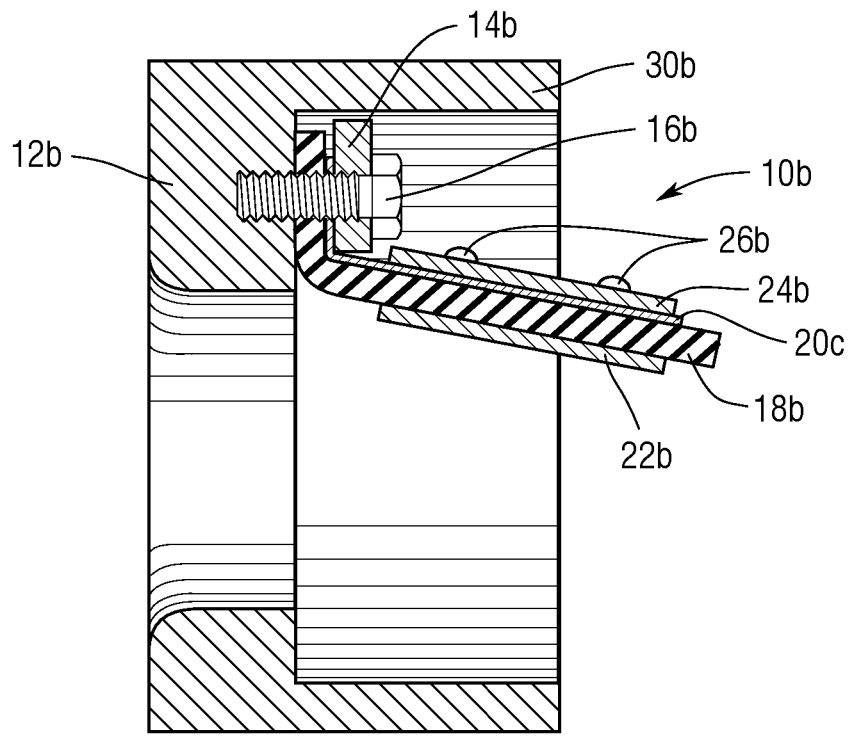
FIG. 4B is a cross-sectional view of a single plate elastomeric hinge check valve assembly installed in a valve body incorporating a layer of reinforcement material on the downstream side of the elastomeric member.
Figure 4C:
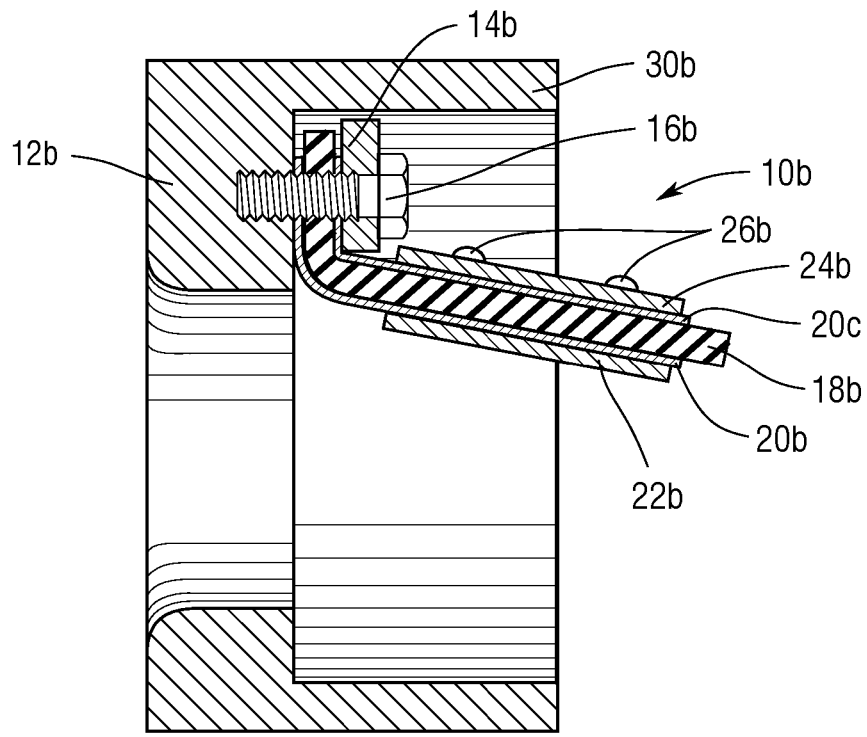
FIG. 4C is a cross-sectional view of a single plate elastomeric hinge check valve assembly installed in a valve body incorporating a layer of reinforcement material on both sides of the elastomeric member.

A dual plate elastomeric hinge check valve depicted in FIGS. 1, 2 and 3A shows one embodiment of an elastomeric hinge check valve assembly 10 incorporating a layer of reinforcement material 20, which will be described in greater detail below. The elastomeric hinge check valves assembly 10 includes an elastomeric hinge, which typically comprises an elastomeric member 18 and hinge member 14 around which the elastomeric member 18 can bend. The elastomeric member 18 is usually coupled to the hinge post 12 and the hinge member 14 to secure the pieces together. The elastomeric member 18 is coupled to the hinge member 14 with mounting screws 16 that also extend through the layer of reinforcement material 20 and fit into the threads 17 in hinge post 12. The elastomeric member 18 is usually coupled to at least one rigid valve plate 22, which provides strength and rigidity to the check valve mechanism. In the embodiment shown in FIGS. 1, 2 and 3A, the elastomeric member 18 is coupled between a rigid valve plate 22 and a clamp plate 24 to form a sandwich. In the dual plate check valve assembly 10, one rigid valve plate 22 is mounted on each side of the hinge post. Both rigid valve plates 22 are used to cover the entire opening of the valve body 30 when the check valve is in the closed position. At least one layer of reinforcement material 20 is coupled to the elastomeric member 18. In the embodiment show in FIG. 1, the layer of reinforcement material 20 extends from the hinge number 14 and under the rigid valve plates 22 on both sides of the hinge member 14.

Various designs of elastomeric check valves include, among other things, springs or other mechanical devices (not shown) to bias the check valve in a closed position. A stop bar (not shown) can also be included to halt the travel of the rigid valve plates 22 toward the middle of the valve body 30 when the check valve is in the open position.

As shown in FIG. 3A, the elastomeric member 18 is typically sized to fit into the valve body 30 such that when the check valve is in the closed position, the elastomeric member 18 forms a seal against the inner dimension of the valve body 30. The valve body 30 is typically a conduit or pipe having an inner diameter that approximately corresponds to the inner diameter of the pipe system in which the check valve is to be used. The ends of the valve body 30 typically have male or female threaded ends (not shown) to connect it to the conduit system to which it will be installed, but other fastening means can be employed, such as quick-connect couplings, flange ends, etc., as called for by a particular application. If necessary, the valve body 30 can be welded into the conduit system.

The valve body 30 usually has holes (not shown) drilled in it to correspond to the threaded holes 13 on the hinge post 12 of the elastomeric hinge check valve assembly 10 as seen in FIGS. 1, 2 and 3A. Typically the hinge post 12 would have threaded holes at both ends, although only one threaded hole 13 is shown in FIGS. 1, 2 and 3A The elastomeric hinge check valve assembly 10 is secured to the valve body 30 with screws (not shown) that mount through holes in the valve body 30 and fit into threaded holes 13 in the hinge post 12. The elastomeric hinge check valve assembly 10 may be sold housed in a valve body 30 for installation in a conduit system or sold without a valve body for later installation into an appropriate valve body.

The elastomeric hinge check valve assembly 10 and the valve body 30 in which it is installed can be made form a variety of materials depending on the application in which it is used. Valves of this type have been made of metals such as steel, stainless steel, brass, aluminum, and plastics such as PVC and CPVC, but other materials can also be used. The material out of which elastomeric member 18 is made can also be varied according to the application, but a typical elastomer is buna-N rubber. Elastomers such as white neoprene that are approved by the Food and Drug Administration are used for food grade applications.

One of the weak points of elastomeric hinge check valves is the elastomeric member 18 itself. The elastomeric member 18 is typically made of a flexible rubber or other elastomeric material that can bend around the hinge. Over the course of its operating life, the elastomeric member 18 will tend to stretch or will be abraded due to contact against the edge portions of the rigid valve plates 22, or due to erosion caused by the material flowing in a conduit system in which the check valve is installed. The effects of these stresses can stretch and cut the elastomeric member 18 making the valve ineffective or less effective and reduce the life expectancy of the valve. While the rigid valve plates 22 and clamp plates 24 provide significant support to the elastomeric member 18 over the area that they cover, they provide no protection to the elastomeric member 18 around the hinge member 14 and at the gaps between the rigid valve plates 22 and the hinge post 12. The stresses on the elastomeric members 18 of the check valve are reduced by providing at least one layer of reinforcement material 20 to support the elastomeric member 18 between at least the hinge number 14 and the rigid valve plates 22 on both sides of hinge member 14.

The layer of reinforcement material 20 is selected from materials that are at least flexible enough to be able to move over the range of movement of the elastomeric member 18 without cracking and are substantially unstretchable to limit the amount of stretching experienced by the elastomeric member 18. The layer of reinforcement material 20 should also be capable of resisting abrasion forces such as those discussed above incurred while the check valve is in operation.

Polytetrafluroethelyne coated fiberglass fabric sold by Green Belting Industries Ltd. as Fluorfab Fabric has been found to be a suitable material for the layer of reinforcement material. Polytetrafluroethelyne coated fiberglass fabric of about 0.005 inches thick has been tested, and it is believed the thickness of the layer of reinforcement material may be increased for larger valves or high pressure applications. Polytetrafluroethelyne, vinyl-coated polyester mesh fabric 0.16 inches thick sold by Catalina Graphic Films, Inc., 10 oz/sq yd lightweight vinyl-laminated polyester fabric sold by Mauritzon Inc. as Facilon, and 0.005 inches thick polyetheretherketone sold by Victrex USA, Inc. as PEEK are among the materials that have been determined to meet the general requirements for being used as a layer of reinforcement material. However, it will be appreciated that other materials that generally meet these requirements will also be suitable and are contemplated to be within the scope of the invention. Materials with embedded fabric meshes, i.e. those that include interwoven networks of fibers, have additional reinforcement benefits compared to the same material without the embedded meshes.

The type of reinforcement material used may also be varied depending on the application for which the check valve is to be used. In conduits that channel harsh chemicals, the reinforcement material should be selected to have some resistance to the chemicals to which the valve is exposed. As has been already mentioned, higher-pressure environments may call for thicker layers of reinforcement material. In applications in which the check valve is subject to impacts from solid material or grit in the fluid stream, materials that are resistant to cracking or tearing will be needed. The reinforcement material should also be resistant to water or whatever other liquid is being controlled by the check valve. Reinforcement materials suitable for each application of this invention are chosen empirically, based on appropriate testing and the knowledge of those skilled in the art of designing check valves regarding the effects on various materials of the types of fluids to which a particular check valve will be subjected.

A custom test stand to test reinforcement materials 18 used in a check valve assembly 10 was commissioned and built by Kennedy Electric of Girard, Pa. The test stand was designed to be capable of testing valves with diameters ranging from about 1 inch to about 4 inches. The testing apparatus includes various air hoses, a source of compressed air, pressure relief valves, and a computerized controller to manage the testing apparatus and to log test results. A dual plate elastomeric hinge check valve assembly to be tested was installed in a valve body and secured to the test stand with clamps. End caps with fittings to accommodate air hoses were mounted to each end of the valve. Air hoses connected to the testing apparatus were then connected to both end caps of the secured valve.

When the testing began, the system was pressurized to force the check valve to the closed position. The testing apparatus then monitored the check valve to determine if there were any changes in pressure, which would indicate leakage of air around or through the elastomeric member. After holding the pressure steady for a pre-determined amount of time, the testing apparatus reversed the air pressure and blew the valve into the fully open position. The testing apparatus repeated the closing cycle, followed by the opening cycle to simulate the operation of the check valve installed in a conduit system. A digital counter on the computerized controller tracked the number of completed cycles. If during any cycle the valve failed to provide a leak-free seal, the testing apparatus shut down and the digital counter displayed the number of cycles that were completed before the valve failed.

Testing has been conducted of a 4-inch Technocheck aluminum dual plate elastomeric hinge check valve having a valve body with male threaded ends without spring biasing and without a layer of reinforcement material. This valve failed at 7,144 cycles. A test was conducted of 4-inch Technocheck aluminum dual plate elastomeric hinge check valve having a layer of 0.008 inches thick Flurofab polytetrafluroethelyne coated fiberglass fabric included as the reinforcement material. The valve had a valve body with male threaded ends and included spring biasing that causes the valve assembly to be normally closed. The testing of that valve assembly was stopped after about 572,000 cycles with no loss of function when the test stand failed. A 2-inch Technocheck aluminum dual plate elastomeric hinge check valve assembly was also tested. This valve had a valve body with male threaded ends and spring biasing. The valve did not include a layer of reinforcement material and failed at 44,536 cycles. Testing was then conducted on a 2-inch Technocheck aluminum dual plate elastomeric hinge check valve assembly with spring biasing that included a layer of 0.005 inches thick Flurofab polytetrafluroethelyne coated fiberglass fabric included as the reinforcement material. The testing of that valve assembly was stopped after about 2,000,000 cycles with no loss of valve function. The reinforcement material had significantly increased the useful life of the elastomeric material. Based on this testing it is expected that thicker materials can also be used as reinforcement material in high pressure applications. Polytetrafluroethelyne coated fiberglass fabric with thickness of 0.010 inches and 0.015 inches are expected to perform satisfactorily with little interference with the function of the check valves.

Testing has also been conducted with other types of reinforcement material on other 2-inch Technocheck dual plate elastomeric hinge check valve assemblies. Testing was conducted on an aluminum 2-inch Technocheck dual plate valve assembly with spring biasing that included a layer of reinforcement material of 0.13 inches thick Facilon 10 oz/sq yd lightweight vinyl-laminated polyester fabric, the valve failed at 121,194 cycles. Testing on a steel 2-inch Technocheck dual plate valve assembly with spring biasing that included a layer of reinforcement material of 0.005 inches thick PEEK polyetheretherketone, the valve failed at 179,893 cycles. The testing of a brass 2-inch Technocheck dual plate valve assembly with spring biasing that included a layer of reinforcement material of 0.16 inches thick Thermeez vinyl-coated polyester mesh was stopped at 130,000 cycles with no loss of valve function.

FIG. 2 shows how the elastomeric check valve assembly 10 of FIG. 1 is assembled. As can be best understood by comparing FIGS. 1, 2, and 3A, the elastomeric hinge check valve assembly 10 is connected to a valve body 30 with screws (not shown) through threaded holes 13 at both ends of the main post 12. The elastomeric member 18 is sized and shaped to fit and form a seal against the inside surface of the valve body 30 in which the elastomeric check valve assembly 10 is installed when the elastomeric check valve assembly 10 is in the closed position. In the embodiment depicted in FIGS. 1, 2, and 3A, the layer of reinforcement material 20 is positioned on the upstream side of the elastomeric member 18.

FIGS. 1 and 2 show the at least one layer of reinforcement material 20 coupled to the elastomeric member with mounting screws 16 that are also used to couple the rigid valve plates 22 and the clamp plates 24 to the elastomeric member 18. However, other fasteners can be used such as pins, nuts and bolts, or any other appropriate means. Adhesives or other bonding agents can also be used between the elastomeric member 18 and the at least one layer of reinforcement material 20 if appropriate for the particular application of the check valve.

In embodiments in which the elastomeric member 18 is coupled to the rigid valve plates 22 with fasteners as with the embodiment shown in FIGS. 1 and 2, the elastomeric member 18 covers the area from at least where the layer of reinforcement material 20 is coupled to the hinge member 14 to at least where the elastomeric member 18 is coupled to the rigid valve plates 22. However, if adhesives were used to couple the layer of reinforcement material 20 to the elastomeric member 18, then the layer of reinforcement material would need to at least the portions of the elastomeric member 18 subject to the greatest amount of wear, i.e. the exposed areas and portions along the edge portions of the check valve.

FIG. 3A shows the elastomeric hinge check valve assembly 10 in the normal course of operation housed in a valve body 30 that is installed in a conduit system that conveys material required to flow in one direction. As shown in FIG. 3A, when material flows downstream through the valve body 30, the valve is pushed in the direction of arrows 32 into an open position depicted by dotted lines 34. The open position allows flow to pass through the valve body to the downstream portion of the conduit system. When the downstream flow stops and the material begins to flow upstream, the rigid valve plates 22 are forced back along the direction of arrows 32 into the closed position where the elastomeric member 18 forms a seal against the inner dimension of the valve body 30 against continued upstream flow. Various designs of check valves incorporate assemblies (not shown) to bias the rigid valve plates 22 in the closed position or provide travel stops to ensure the rigid valve plates 22 do not open beyond operational limits. The invention is easily applied to all such variations, as it is independent of such variations.

Figure 3B:
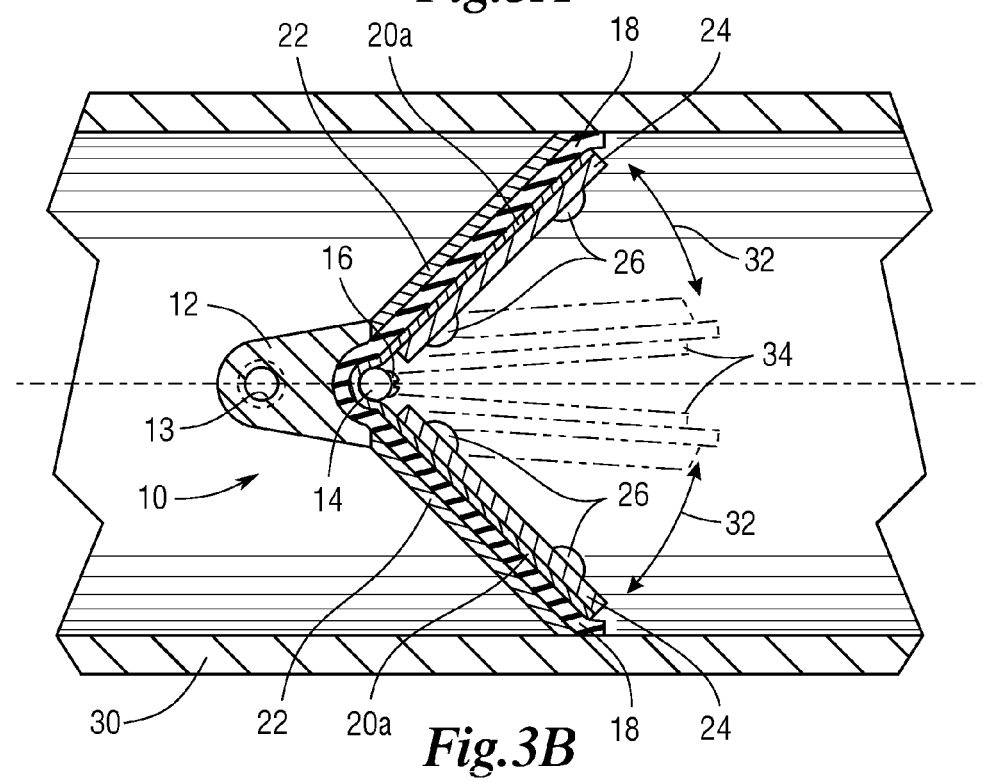
FIG. 3B is a cross-sectional view of a dual plate elastomeric hinge check valve assembly installed in a valve body incorporating a layer of reinforcement material on the downstream side of the elastomeric member.
Figure 3C:
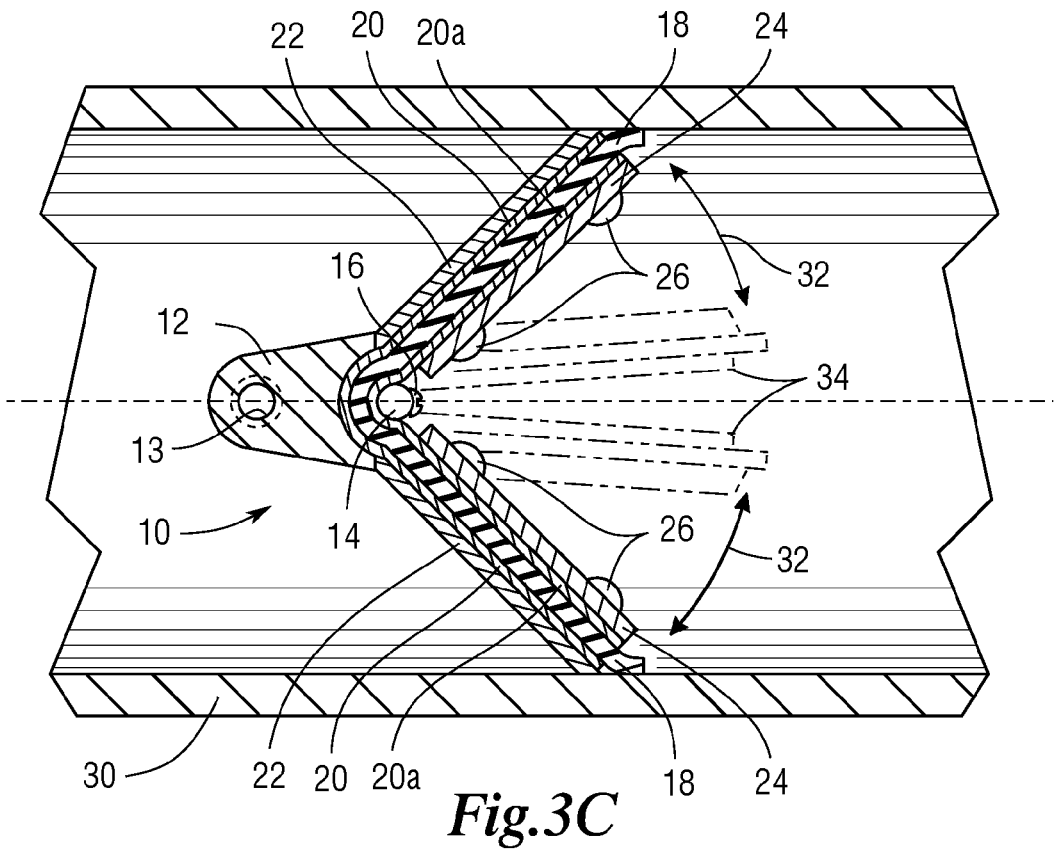
FIG. 3C is a cross-sectional view of a dual plate elastomeric hinge check valve assembly installed in a valve body incorporating a layer of reinforcement material on both sides of the elastomeric member.

It will be appreciated that while FIGS. 1, 2 and 3A show the check valve assembly 10 with the layer of reinforcement material 20 on the upstream side of the elastomeric member 18, some benefit will be achieved if the reinforcement material 20a is located on the downstream side of the elastomeric member 18 as depicted in FIG. 3B. In addition, both sides of the elastomeric member 18 can have a layer of reinforcement material 20, 20a as depicted in FIG. 3C.

As has already been discussed, this invention is applicable to any variation in design of dual plate elastomeric hinge check valves. It is also applicable to single plate elastomeric hinge check valves as depicted, for example, in FIG. 4A. In a single plate elastomeric hinge check valve assembly 10b, a rigid valve plate 22b is set on only one side of the hinge member 14b. As with the dual plate elastomeric hinge check valves, the elastomeric member 18b and the rigid valve plate 22b are sized to cover the cross-sectional area of the valve body 30b through which the material flows. As described with the dual plate elastomeric hinge check valves, the single plate elastomeric hinge check valves may also be equipped with, among other things, springs or other mechanical devices (not shown) to bias the check valve in a closed position. A stop bar (not shown) can also be included to halt the travel of the rigid valve plate 22b when the check valve is in the open position.

FIG. 4A depicts the layer of reinforcement material 20b positioned on the upstream side of the elastomeric member 18b, but it will be appreciated that other configurations are possible. FIG. 4B depicts a single plate elastomeric hinge check valve assembly 10b in which the layer reinforcement material 20c is positioned on the downstream side of the elastomeric member 18b. FIG. 4C depicts a single plate elastomeric hinge check valve assembly 10b in which two layers of reinforcement material 20b, 20c are used with one layer of reinforcement material 20c positioned on the downstream side of the elastomeric member 18 and one layer of reinforcement material 20b positioned on the upstream side of the elastomeric member 18.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed:

1. A check valve assembly installable in a valve body comprising:
    an elastomeric hinge which includes an elastomeric member and a hinge member around which said elastomeric member can bend, said elastomeric member coupled to said hinge member;
    at least one rigid valve plate coupled to said elastomeric member; and
    at least one layer of reinforcement material coupled to said elastomeric member and external to said elastomeric member, extending at least between said hinge member and said at least one rigid valve plate, said reinforcement material being sufficiently flexible to bend over the range of movement of said elastomeric member, substantially unstretchable, and capable of resisting abrasion forces encountered while a check valve is in operation.

2. The check valve assembly of claim 1 further comprising said elastomeric member sized and configured to form a seal against the inner dimensions of the valve body when said check valve is in the closed position.

3. The check valve assembly of claim 1 further comprising said reinforcement material sized to reinforce said elastomeric member from at least where said elastomeric member is coupled to said hinge member to at least where said elastomeric member is coupled to said at least one rigid valve plate.

4. The check valve assembly of claim 1 further comprising
said hinge member installed at about the center of said check valve assembly with said elastomeric member extending on two sides of said hinge member; and
two said rigid valve plates coupled to said elastomeric member with one of said rigid valve plates on each side of said hinge member.

5. The check valve assembly of claim 1 further comprising at least one clamp plate coupled to each at least one rigid valve plate through said elastomeric member and said layer of reinforcement material.

6. The check valve assembly of claim 1 further comprising said elastomeric hinge mounted to a hinge post.

7. The check valve assembly of claim 1 wherein said at least one layer of reinforcement material is coupled to the upstream side of said elastomeric member.

8. The check valve assembly of claim 1 wherein said at least one layer of reinforcement material is coupled to the downstream side of said elastomeric member.

9. The check valve assembly of claim 1 wherein said at least one layer of reinforcement material comprises at least one layer of reinforcement material coupled to the upstream side of said elastomeric member and at least one layer of reinforcement material coupled to the downstream side of said elastomeric member.

10. The check valve assembly of claim 1 wherein said reinforcement material is also at least water resistant.

11. The check valve assembly of claim 1 wherein said reinforcement material is also at least chemical resistant.

12. The check valve assembly of claim 1 wherein said reinforcement material is also at least crack resistant.

13. The check valve assembly of claim 1 wherein said reinforcement material includes fibers extending in at least one direction in the layer.

14. The check valve assembly of claim 1 wherein said reinforcement material includes an interwoven network of fibers.

15. The check valve assembly of claim 1 wherein said reinforcement material includes fibers from the group consisting of glass fibers, ceramic fibers, and polyester fibers.

16. The check valve assembly of claim 1 wherein said reinforcement material is from the group consisting of polytetrafluroethelyne, vinyl-coated polyester mesh fabric, 10 oz/sq yd lightweight vinyl-laminated polyester fabric, polyetheretherketone, and polytetrafluroethelyne coated fiberglass fabric.

17. The check valve assembly of claim 1 wherein said reinforcement material is from about 0.005 inches thick to about 0.15 inches thick polytetrafluroethelyne.

18. The check valve assembly of claim 1 wherein said reinforcement material is about 0.016 inches thick vinyl-coated polyester mesh fabric.

19. The check valve assembly of claim 1 wherein said reinforcement material is about 0.013 inches thick 10 oz/sq yd lightweight vinyl-laminated polyester fabric.

20. The check valve assembly of claim 1 wherein said reinforcement material is about 0.005 inches thick polyetheretherketone.

21. The check valve assembly of claim 1 wherein said reinforcement material is from about 0.005 inches thick to about 0.015 inches thick polytetrafluroethelyne coated fiberglass fabric.

22. The check valve assembly of claim 1 wherein said at least one layer of reinforcement material is coupled to said elastomeric member with fasteners from the group consisting of screws, nuts and bolts, pins, adhesives, and bonding agents.

23. A check valve comprising:
a valve body; and
a check valve assembly installed in said valve body, said valve body comprising an elastomeric hinge which includes an elastomeric member and a hinge member around which said elastomeric member can bend, said elastomeric member coupled to said hinge member, at least one rigid valve plate coupled to said elastomeric member, and at least one layer of reinforcement material coupled to said elastomeric member and external to said elastomeric member, extending at least between said hinge member and said at least one rigid valve plate, said reinforcement material being sufficiently flexible to bend over the range of movement of said elastomeric member, substantially unstretchable, and capable of resisting abrasion forces encountered while said check valve is in operation.

24. The check valve of claim 23 further comprising said elastomeric member sized and configured to form a seal against the inner dimensions of said valve body when said check valve is in the closed position.

25. The check valve of claim 23 further comprising said reinforcement material sized to reinforce said elastomeric member from at least where said elastomeric member is coupled to said hinge member to at least where said elastomeric member is coupled to said at least one rigid valve plate.

26. The check valve of claim 23 further comprising
said hinge member installed at about the center of said check valve assembly with said elastomeric member extending on two sides of said hinge member; and
two said rigid valve plates coupled to said elastomeric member with one of said rigid valve plates on each side of said hinge member.

27. The check valve of claim 23 further comprising at least one clamp plate coupled to each at least one rigid valve plate through said elastomeric member and said layer of reinforcement material.

28. The check valve of claim 23 further comprising said elastomeric hinge mounted to a hinge post.

29. The check valve of claim 23 wherein said at least one layer of reinforcement material is coupled to the upstream side of said elastomeric member.

30. The check valve of claim 23 wherein said at least one layer of reinforcement material is coupled to the downstream side of said elastomeric member.

31. The check valve of claim 23 wherein said at least one layer of reinforcement material comprises at least one layer of reinforcement material coupled to the upstream side of said elastomeric member and at least one layer of reinforcement material coupled to the downstream side of said elastomeric member.

32. The check valve of claim 23 wherein said reinforcement material is also at least water resistant.

33. The check valve of claim 23 wherein said reinforcement material is also at least chemical resistant.

34. The check valve of claim 23 wherein said reinforcement material is also at least crack resistant.

35. The check valve of claim 23 wherein said reinforcement material includes fibers extending in at least one direction in the layer.

36. The check valve of claim 23 wherein said reinforcement material includes an interwoven network of fibers.

37. The check valve of claim 23 wherein said reinforcement material includes fibers from the group consisting of glass fibers, ceramic fibers, and polyester fibers.

38. The check valve of claim 23 wherein said reinforcement material is from the group consisting of polytetrafluroethelyne, vinyl-coated polyester mesh fabric, 10 oz/sq yd lightweight vinyl-laminated polyester fabric, polyetheretherketone, and polytetrafluroethelyne coated fiberglass fabric.

39. The check valve of claim 23 wherein said reinforcement material is from about 0.005 inches thick to about 0.15 inches thick polytetrafluroethelyne.

40. The check valve of claim 23 wherein said reinforcement material is about 0.016 inches thick vinyl-coated polyester mesh fabric.

41. The check valve of claim 23 wherein said reinforcement material is about 0.013 inches thick 10 oz/sq yd lightweight vinyl-laminated polyester fabric.

42. The check valve of claim 23 wherein said reinforcement material is about 0.005 inches thick polyetheretherketone.

43. The check valve of claim 23 wherein said reinforcement material is from about 0.005 inches thick to about 0.015 inches thick polytetrafluroethelyne coated fiberglass fabric.

44. The check valve of claim 23 wherein said at least one layer of reinforcement material is coupled to said elastomeric member with fasteners from the group consisting of screws, nuts and bolts, pins, adhesives, and bonding agents.

45. A check valve assembly installable in a valve body comprising:
an elastomeric hinge which includes an elastomeric member and a hinge member around which said elastomeric member can bend, said hinge member installed at about the center of said check valve assembly with said elastomeric member extending on two sides of said hinge member, said elastomeric member coupled to said hinge member, said elastomeric member sized and configured to form a seal against the inner dimensions of the valve body when said check valve is in the closed position;
two rigid valve plates coupled to said elastomeric member, with one of said rigid valve plates on each side of said hinge member; and
at least one layer of reinforcement material coupled to said elastomeric member and external to said elastomeric member, sized to reinforce said elastomeric member from at least where said elastomeric member is coupled to said hinge member to at least where said elastomeric member is coupled to said at least one rigid valve plate, said reinforcement material being sufficiently flexible to bend over the range of movement of said elastomeric member, substantially unstretchable, and capable of resisting abrasion forces encountered while said check valve is in operation.

46. The check valve assembly of claim 45 further comprising at least one clamp plate coupled to each at least one rigid valve plate through said elastomeric member and said layer of reinforcement material.

47. The check valve assembly of claim 45 further comprising said elastomeric hinge mounted to a hinge post.

48. The check valve assembly of claim 45 wherein said reinforcement material includes fibers extending in at least one direction in the layer.

49. The check valve assembly of claim 45 wherein said reinforcement material includes an interwoven network of fibers.

50. The check valve assembly of claim 45 wherein said reinforcement material includes fibers from the group consisting of glass fibers, ceramic fibers, and polyester fibers.

51. The check valve assembly of claim 45 wherein said reinforcement material is from the group consisting of polytetrafluroethelyne, vinyl-coated polyester mesh fabric, 10 oz/sq yd lightweight vinyl-laminated polyester fabric, polyetheretherketone, and polytetrafluroethelyne coated fiberglass fabric.

* * * * *